(12) United States Patent
Davidson et al.

(10) Patent No.: US 8,311,558 B2
(45) Date of Patent: Nov. 13, 2012

(54) REAL-TIME NETWORK NODE LOCATION SYSTEM AND METHOD

(75) Inventors: Erik J. Davidson, State College, PA (US); Sven G. Bilén, State College, PA (US); Daniel R. Weiss, State College, PA (US); Nicholas E. Platt, Boalsburg, PA (US); Erik D. Weir, State College, PA (US)

(73) Assignee: Buzby Networks, LLC, State College, PA (US)

( * ) Notice: Subject to any disclaimer, the term of this patent is extended or adjusted under 35 U.S.C. 154(b) by 423 days.

(21) Appl. No.: 12/728,966

(22) Filed: Mar. 22, 2010

(65) Prior Publication Data
US 2010/0238862 A1 Sep. 23, 2010

Related U.S. Application Data

(60) Provisional application No. 61/162,029, filed on Mar. 20, 2009.

(51) Int. Cl.
*H04W 24/00* (2009.01)
(52) U.S. Cl. ............... 455/456.1; 370/338; 455/422.1
(58) Field of Classification Search .............. 455/403, 455/404.1, 404.2, 422.1, 456.1–456.6; 370/310, 370/332, 333, 338
See application file for complete search history.

(56) References Cited

U.S. PATENT DOCUMENTS

| | | | |
|---|---|---|---|
| 4,656,479 A | 4/1987 | Kirimoto et al. | |
| 4,728,959 A | 3/1988 | Maloney et al. | |
| 5,293,642 A | 3/1994 | Lo | |
| 6,259,406 B1 | 7/2001 | Sugiura et al. | |
| 6,342,854 B1 | 1/2002 | Duffett-Smith et al. | |
| 6,529,164 B1 | 3/2003 | Carter | |
| 6,552,661 B1 | 4/2003 | Lastinger et al. | |
| 6,674,403 B2 | 1/2004 | Gray et al. | |
| 6,799,047 B1 | 9/2004 | Bahl et al. | |
| 6,850,761 B2 | 2/2005 | Pallonen | |
| 6,963,301 B2 | 11/2005 | Schantz et al. | |
| 7,053,830 B2 | 5/2006 | Krumm et al. | |
| 7,298,327 B2 | 11/2007 | Dupray et al. | |
| 7,312,752 B2 | 12/2007 | Smith et al. | |
| 2005/0227703 A1 | 10/2005 | Cheng | |
| 2006/0044134 A1 | 3/2006 | Elliott | |
| 2006/0132352 A1 | 6/2006 | Schantz et al. | |
| 2008/0130604 A1* | 6/2008 | Boyd | 370/338 |
| 2008/0261614 A1* | 10/2008 | Mia et al. | 455/456.1 |
| 2010/0150038 A1* | 6/2010 | Nanda et al. | 370/310 |
| 2011/0222448 A1* | 9/2011 | Ofek et al. | 370/310 |

FOREIGN PATENT DOCUMENTS
JP 2009243988 A 10/2009
* cited by examiner

*Primary Examiner* — Ajit Patel
(74) *Attorney, Agent, or Firm* — Spilman Thomas & Battle, PLLC

(57) ABSTRACT

A real-time location system and method for a wireless network includes, in one embodiment: (a) obtaining received signal-strength indicator measurements between stationary routers and mobile devices; (b) determining the relative angles of mobile devices from stationary routers using directional antenna systems; and (c) using signal strength and angle information to calculate the location of mobile devices.

34 Claims, 13 Drawing Sheets

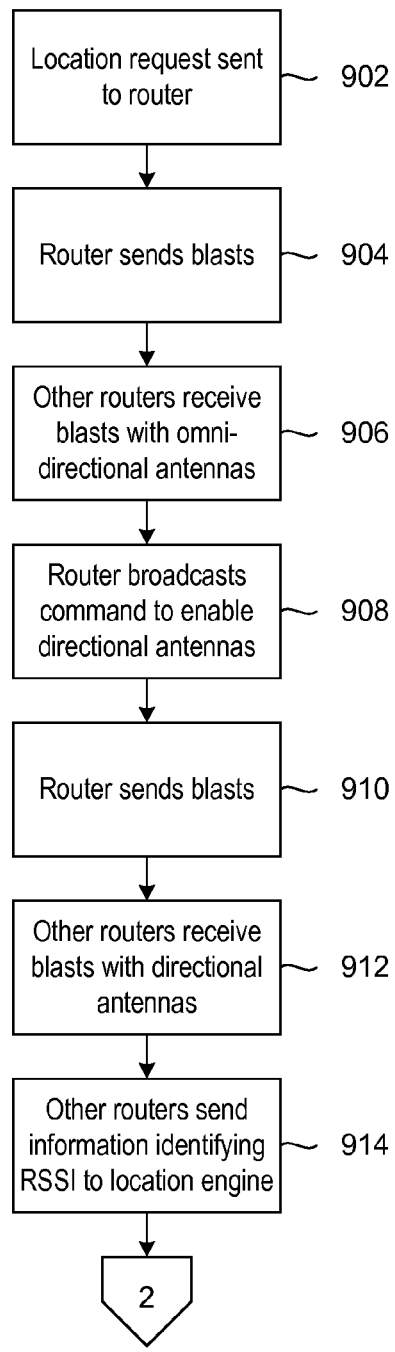
FIG. 9 (part 1)

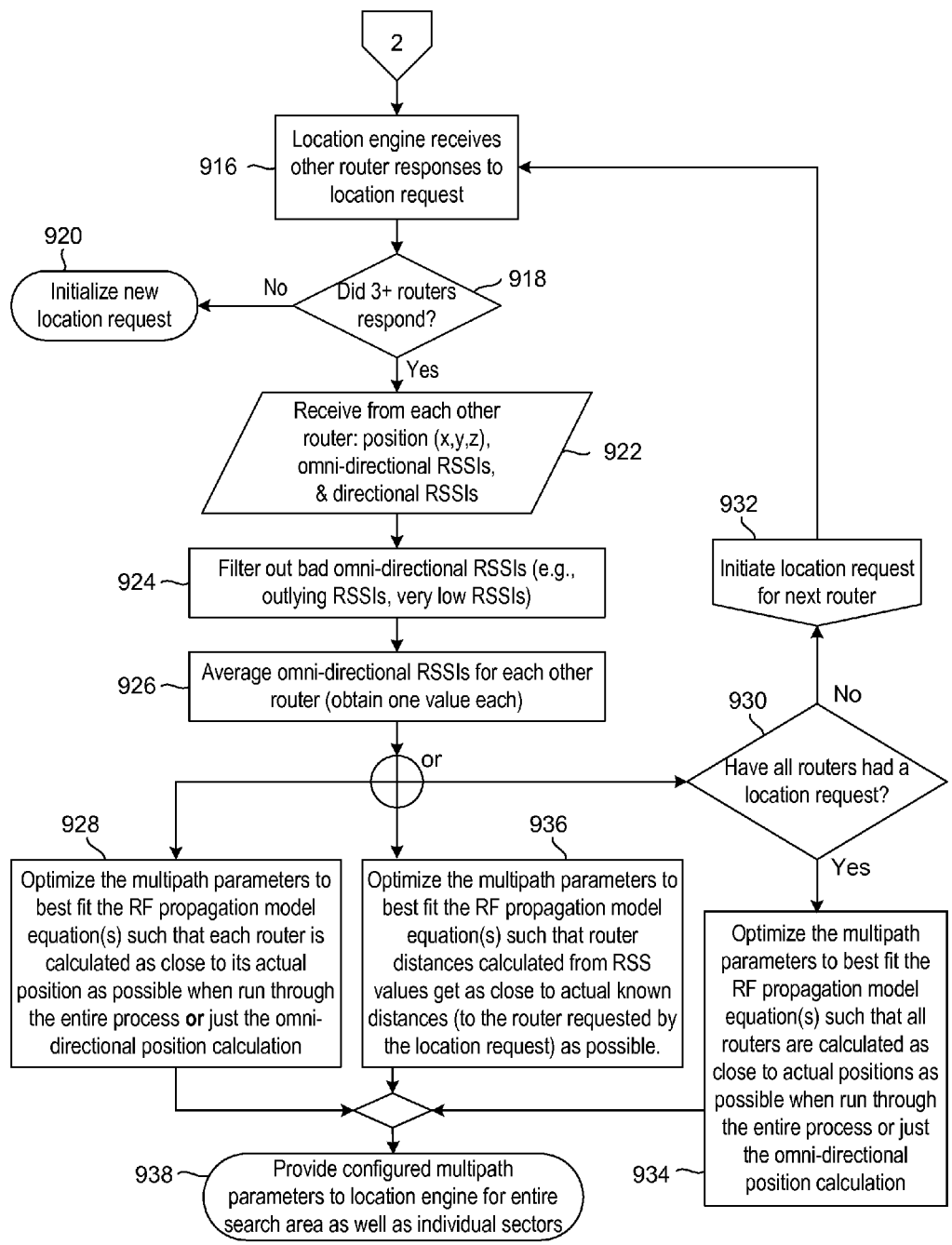
FIG. 9 (part 2)

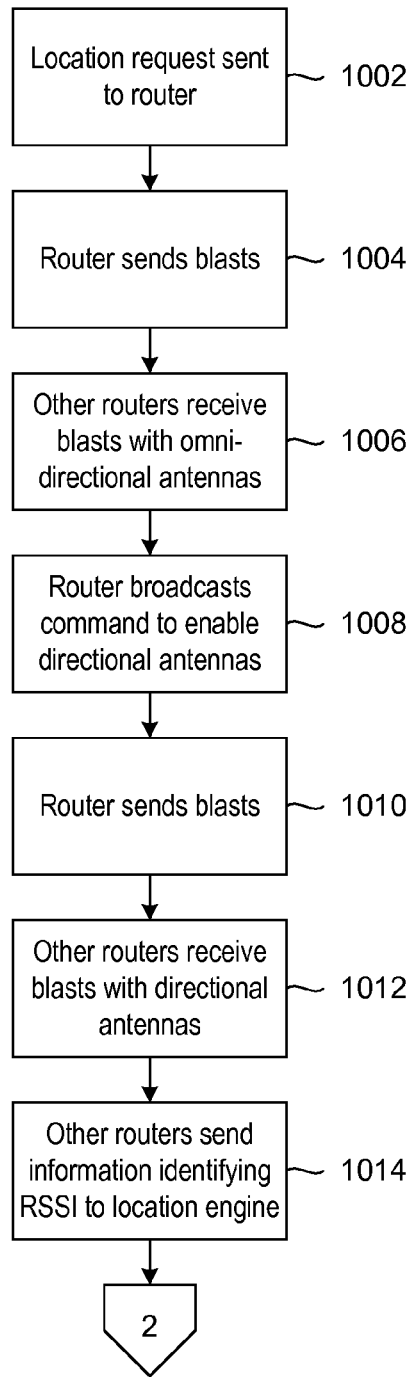
FIG. 10 (part 1)

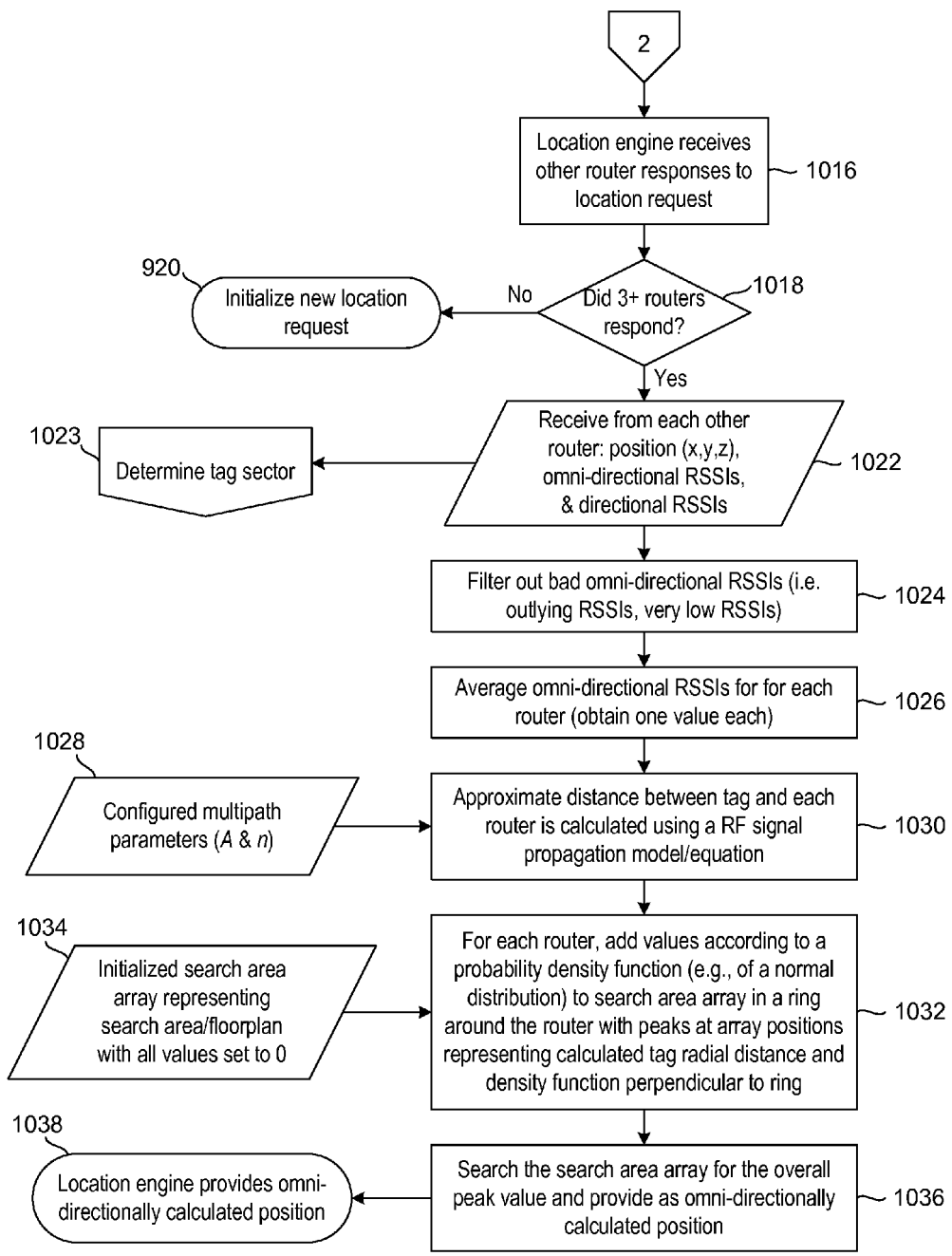
FIG. 10 (part 2)

REAL-TIME NETWORK NODE LOCATION SYSTEM AND METHOD

BACKGROUND OF THE INVENTION

1. Field of the Invention

The invention relates to the field of wireless local area networks (WLAN), and more particularly, to a wireless system for locating mobile nodes within a monitored environment using a combination of RSSI (received signal-strength indicator) and sector discrimination using an array of limited-field-of-view antennas.

2. Description of Related Art

Wireless area networks are becoming more commonplace as wireless devices decrease in size, cost, and power consumption. As these devices slowly replace their wired counterparts in the areas of sensors and personal wireless devices, networks grow from a few devices to become facility-wide webs, where information really is only a few wireless hops away. The ZigBee wireless protocol, built on the IEEE 802.15.4 standard, allows for the easy formation of such networks and is becoming increasingly prevalent in the creation of facility-wide mesh networks. The growth of these networks provides a plethora of information that can be analyzed to determine attributes of a node (or wireless network device) on the system. One of these attributes is the location of the node.

Real-time location systems (RTLS) are used to track and identify the location of objects in real-time. A few solutions are currently present using wireless sensor networks or other large wireless mesh networks. These solutions rely on the various methods of signal-to-distance conversions such as time-of-flight arrival (ToFA), received signal-strength indicator (RSSI), and angle of arrival (AoA).

A radio location system suitable for tracking objects over shorter distances is proposed in U.S. Pat. No. 5,119,104. A fixed array of receivers is distributed over the area and a transmitter is attached to the object to be tracked. Time-of-arrival measurements of transmitted signals at the distributed receivers are used to locate the object. However, this system does not take into account multi-path effects or signal propagation differences. Additionally, ToF measurements typically require synchronous clock signals on all devices making them prohibitively complicated and expensive.

Omni-directional RSSI systems use the relative power of received signals from a plurality of nodes to determine relative distances between the nodes. This is described in U.S. Pat. No. 6,963,289 with an RFID system. However, omni-directional RSSI-based systems do not solve the problem of multipath effects or singularities that arise from these multipath effects. The typical solution to this flaw is to use so-called "finger printing" systems that require extensive site surveys to create "heat maps" of the facility. The relative signal strengths measured in real-time are compared to the heat map to determine the most likely point of positioning. Additionally, these systems typically rely on past positions as a predictor of future position. This requires that the solution be real-time in nature. Privacy concerns as well as data management concerns arise with required real-time location tracking.

AoA systems are currently too expensive due to the signal processing power needed to recognize small differences in phase. Currently, AoA systems are focusing on getting exact angles to measure location such as described in U.S. Pat. No. 7,233,799.

Another system combines multiple location estimation methods. Data from RSSI and ToFA systems are combined to form a more accurate and robust system. The patent application 2008/0130604 recognizes the problem that exists with just one of these technologies, but this idea does not address the expense of synchronized clocks that are needed in the ToFA measurements.

It is, therefore, desirable to overcome the above problems and others by providing a system and method that utilizes the potential accuracy of an RSSI-based location finding system with the reliability of a system that provides some sector or other area of location reliability.

SUMMARY OF THE INVENTION

In an embodiment, a real-time network node location system includes: a tag to broadcast a plurality of signals; a plurality of routers each including at least one omni-directional antenna to receive at least a first part of the plurality of signals and at least one directional antenna to receive at least a second part of the plurality of signals, the plurality of routers to transmit information identifying signal strengths of the at least the first part and the at least the second part of the plurality of signals; and a location engine to: process at least the information identifying the signal strengths of the at least the first part of the plurality of signals to determine a position of location of the tag; and process at least the information identifying the signal strengths of the at least the second part of the plurality of signals to determine an area of location of the tag.

In another embodiment, a method for real-time determination of the location of a tag includes: (a) broadcasting, from the tag, a plurality of signals to a plurality of routers, each of the routers comprising one or more omni-directional antennas and one or more directional antennas; (b) receiving, by the one or more omni-directional antennas of each of the plurality of routers, at least a first part of the plurality of signals; (c) receiving, by the one or more omni-directional antennas of each of the plurality of routers, at least a second part of the plurality of signals; (d) transmitting, by each of the plurality of routers, to a location engine, information identifying signal strengths of the first part and the second part of the plurality of signals received; (e) processing, by the location engine, at least the information representing the signal strengths of the first part of the plurality of signals received by each router to determine a position of location of the tag; and (f) processing, by the location engine, at least the information representing the signal strengths of the first part of the plurality of signals received by each router to calculate an area of location of the tag.

In another embodiment, a system for determining a position of location of a tag includes: a plurality of routers each including at least one omni-directional antenna, the plurality of routers comprising at least three routers; and a location engine to: (a) determine for at least one router, from at least a part of signals sent by the one router and received by the at least one omni-directional antenna of each of at least one other of the routers, an average path loss of signal strength; (b) optimize, for at least the one router, multipath parameters in a radio-frequency signal propagation equation using the average path loss for each of the at least one other of the routers and known distance between the router and each of the at least one other of the routers; and (c) determine the position of location of the tag using at least the optimized multipath parameters.

Still other desirable features of the invention will become apparent to those of ordinary skill in the art upon reading and understanding the following detailed description, taken with the accompanying drawings, wherein like reference numerals represent like elements throughout.

Other embodiments, which may include one or more parts of the aforementioned method or systems or other parts, are also contemplated, and may thus have a broader or different scope than the aforementioned method and systems. Thus, the embodiments in this Summary of the Invention are merely examples, and are not intended to limit or define the scope of the invention or claims.

BRIEF DESCRIPTION OF THE DRAWINGS

FIG. 9 is a flow chart outlining a method of calculating multipath parameters for use in determining an omni-directionally calculated position of a tag, in accordance with an embodiment;

FIG. 10 is a flow chart outlining a method of determining an omni-directionally calculated position of a tag, in accordance with an embodiment;

DETAILED DESCRIPTION OF THE INVENTION

The present invention will now be described with reference to the accompanying figures. It is to be understood that the specific systems, methods, and apparatuses illustrated in the attached figures and described in the following specification are simply exemplary embodiments of the present invention and are not to be considered as limiting.

The system of the present invention, in an embodiment, utilizes the potential accuracy of an RSSI-based positional location finding system with the reliability of a system that provides sector or other area locating. The RSSI data may be collected using router omni-directional) (360°) antennas, while the sector or other area forming data may be collected by router antennas that provide a limited directional response. The limited responses of these antennas may create a sector-based or other area-based system that can be used to check the results of the position-finding RSSI system. In an embodiment, the area locating system may also be based, at least in part, on RSSI or other signal strength determinations.

Figure 1:
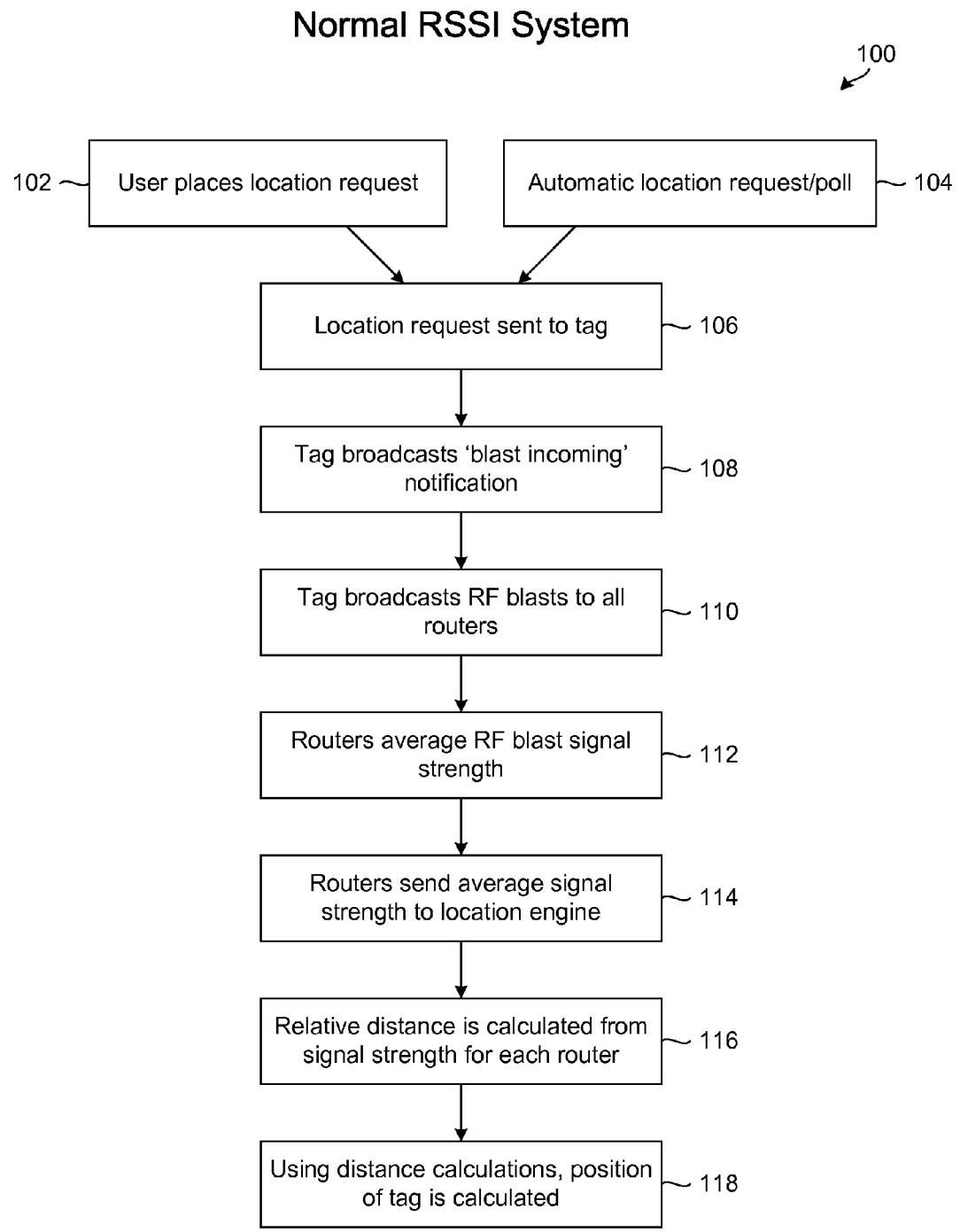
FIG. 1 is a flow chart outlining the operation of a received signal-strength indicator location determination system, in accordance with an embodiment.

FIG. 1 is a flow chart 100 outlining the operation of an RSSI location determination system. The RSSI location determination system may include a computer that may be connected to a wireless gateway, routers, and a smart wireless device or other tag.

In the RSSI location determination system of FIG. 1, a request to locate a tag may be made. The location request may be made by the computer by a user's prompt at 102 or automatically at 104, such as by polling initiated by a controlling program. At 106, the location engine may transmit the location request to the tag by wireless signal. The tag may then respond, at 108, by broadcasting a "blast incoming" notification, notifying the routers to be ready to receive radio frequency (RF) blasts. At 110, the tag broadcasts RF blasts to all of the routers. The routers receive the blasts and, at 112, determine the average signal strength (e.g., average RSSI) of the RF blasts. At 114, each of the routers wirelessly transmits that average signal strength of the RF blasts to the location engine. At 116, the computer, using the average signal strength of the RF blasts from each router, calculates the relative distance of the tag from each router. At 118, the computer uses those relative distances to calculate the position of the tag.

Figure 4:
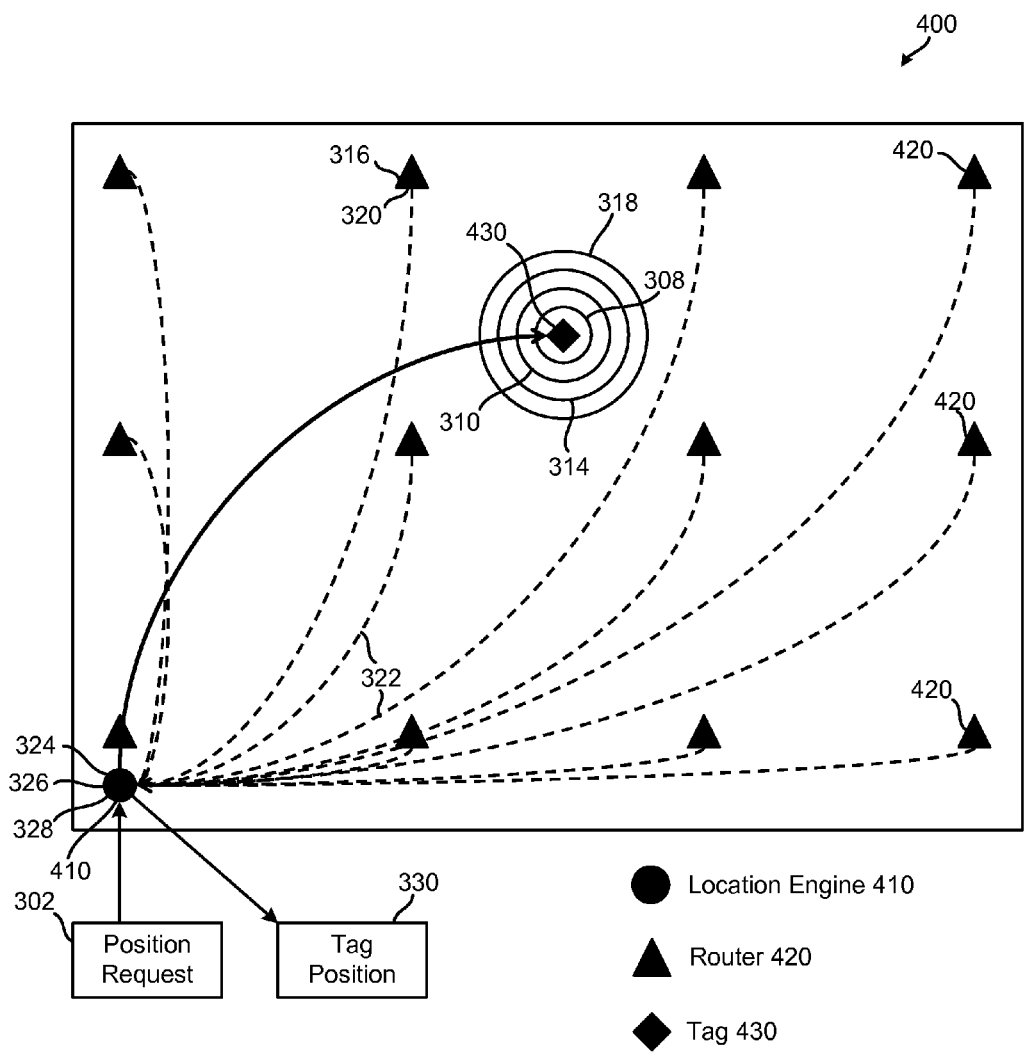
FIG. 4 is a schematic of a real-time network node location system, including the communicative entities of FIG. 3 and the functionality associated therewith within a facility, in accordance with an embodiment.

Generally, in one or more embodiments described herein, there are three pieces of hardware in the system, a position engine, a router, and a tag, though those parts of the system may be embodied in fewer or more pieces in various embodiments. The term "position engine" is also referred to herein as a "location engine." The position engine or location engine may be a dedicated personal computer or any other computer and may be, in an embodiment, connected to a wireless gateway connecting to a system, such as any embodiment of a real-time network node location system described herein. In an embodiment, the position engine or location engine may be placed on one or more routers and/or one or more tags. The position engine or location engine may be a single computer or a distributed computing system in which multiple computers collaborate over a network. The position engine or location engine may have software or firmware that runs a real-time network node location system such as described herein. The router may be a wireless device that is used to extend the wireless network, and to take signal strength and directional antenna measurements using omni-directional and directional antennas, respectively. The tag may be a smart wireless device, which may be powered by battery or by power harvesting techniques, and which may be placed on an object to be tracked if desired. The tag may be any other mobile or other device that can receive wireless signals, and that can transmit wireless signals that may be used to track the location of that device or area in which that device is located. In the embodiment of FIG. 4, which is described below, a circle denotes the position engine 410, a triangle denotes a router 420, and a diamond denotes the tag 430.

Figure 2:
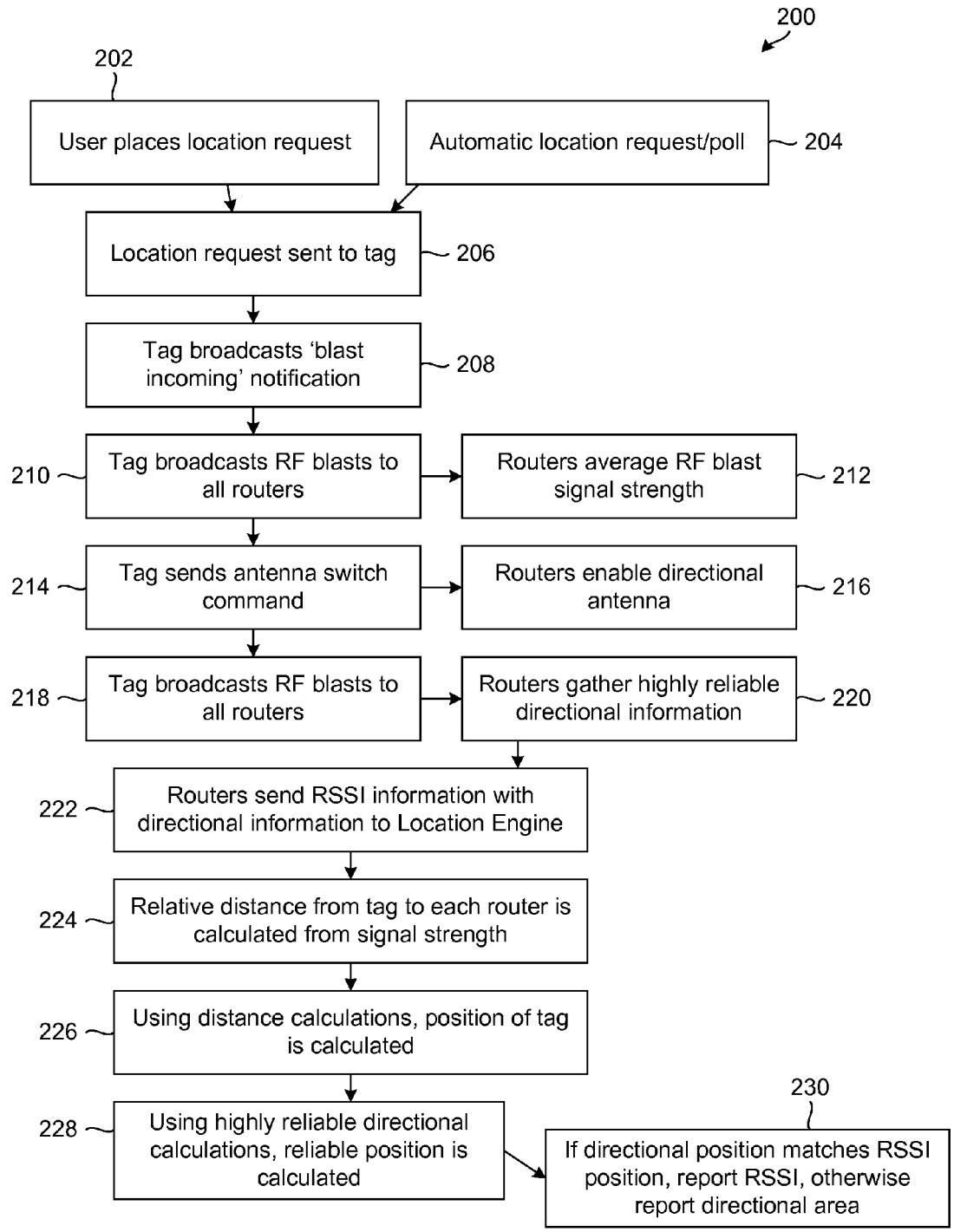
FIG. 2 is a flow chart outlining the operation of a real-time network node location system, in accordance with an embodiment.
Figure 3:
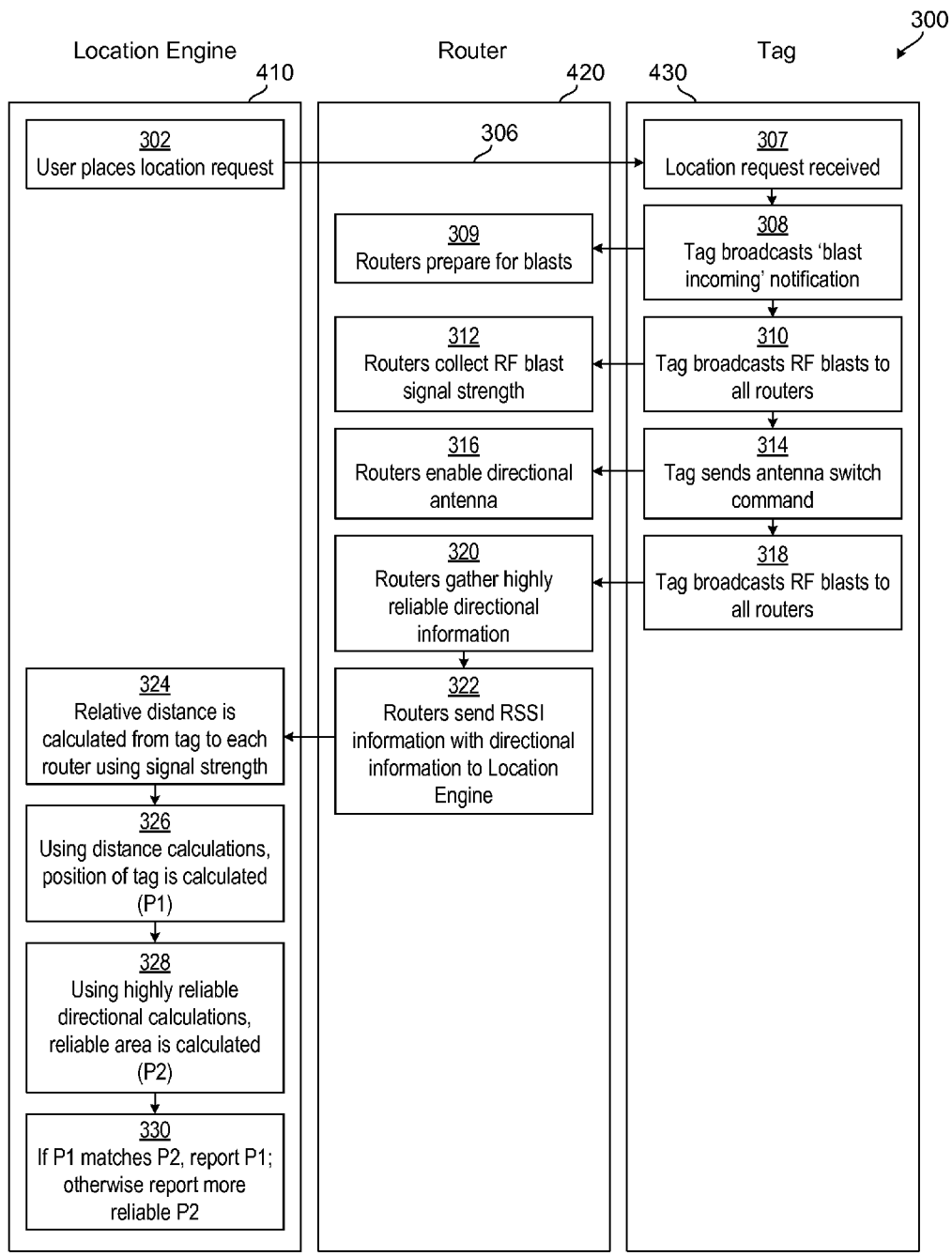
FIG. 3 is a flow chart outlining the operation of a real-time network node location system in the context of the communicative entities associated therewith, in accordance with an embodiment.

The general operation of a real-time network node location system, according to an embodiment, is detailed in FIGS. 2-4. FIG. 2 is a flow chart 200 outlining the operation of an embodiment of a real-time network node location system, such as the real-time network node location system 400 of FIG. 4. FIG. 3 is a flow chart 300 outlining the operation of a real-time network node location system in the context of the communicative entities associated therewith, in accordance with an embodiment. FIG. 4 is a schematic of a real-time network node location system 400, including the communicative entities of FIG. 3 and the functionality associated therewith within a facility, in accordance with an embodiment. Though FIG. 2 is not discussed in detail herein, the discussion herein of 302, 306, 308, 310, 312, 314, 316, 318, 320, 322, 324, 326, 328, and 330 of the real-time location system 300 of FIG. 3 respectively applies to 202, 206, 208, 210, 212, 214, 216, 218, 220, 222, 224, 226, 228, and 230 of the real-time network node location system 200 of FIG. 2.

From FIG. 3, with reference to FIG. 4 where numbers correspond, the first input into the system is, at 302, the user's (or controlling program's) request for a location of a specific tag 430. This message may be routed or otherwise transmitted to the location engine 410. That location request at 302 may thus be made by the location engine 410 via a user's prompt at 302, though in an embodiment, as in FIG. 2 at 204, the location request may be made automatically, such as by polling initiated by the controlling program. At 306, the location engine 410 at this point may send the location request to the tag 430 that is specified. This is shown in FIG. 4 by the arrow extending from the location engine 410 to the tag 430. It is worth noting that this arrow does not follow the exact path of a real mesh network. Mesh networks typically contain short hops to route the message through the network. To simplify the figure, it is assumed that hopping occurs and the arrow is drawn between the source and the destination, though in other embodiments, the location request signal may be travel by other methods.

The tag 430 may receive the location request at 307. At 308, the tag 430 may broadcast to all routers 420 that it is ready to send signals to begin the process of determining the location of the tag 430 using signal strength, such as by trilateration. The signals the tag 430 sends are shown by the ring around the tag 430 labeled 308. The routers 420 may, at 309, receive this message and ready themselves to receive the signals with which to measure signal strength by enabling their omni-directional antennas. In an embodiment, these signal strength communications originating at the tag 430 are called blasts because they represent a characteristic radio-frequency (RF) signal that may be currently meaningless except to identify the node from which they have come. In an embodiment, the tag 430 may transmit information during the blast sequence.

When the routers 420 are ready, the tag 430, at 310, may release a designated number of blasts. The release of the blasts is shown in FIG. 4 by the ring around the tag 430 labeled 310. This may allow routers 420, at 312, to collect the blasted RF signals and determine an RSSI for each signal. In an embodiment, the routers 420, at 312, take an average signal strength measurement from the RSSIs of all the signals received, though the routers 420 may not take that average in other embodiments. The RSSI values received, or average RSSI in an embodiment, may be stored on each router 420 until all of the information is collected and the directional measurement, described below, is taken.

The tag 430 may then, at 314, broadcast a command to all routers 420 to switch over to the directional system, as shown in FIG. 4 by the ring labeled 314. The routers 420 may then, at 316, switch to receive information from the directional system by enabling their directional antennas. At 318, the tag 430 may blast a designated number of times. The blasts are shown in FIG. 4 by the fourth ring around the tag 430 labeled 318. The routers 420 may, at 320, receive and collect the blasts and determine directional RSSIs therefrom. The directional measurements may be highly reliable in an embodiment, and may be more reliable than the omni-directional RSSI measurements. The routers 420 may, at 322, send both pieces of information, the omni-directional and directional signal strength measurements, back to the location engine 410. If the omni-directional or directional RSSIs were not averaged by the router 420, each router 420 may send all those RSSI values it collected to the location engine 410. Alternatively, in the embodiment in which the router 420 averaged those RSSI values, the router 420 may send the averaged RSSI values to the location engine 410.

At the location engine 410, at 324, the omni-directional RSSI values may be turned into distance estimations between the routers 420 and the tag 430. The location engine 410 may, for each router 420, average the RSSI values the router 420 sent in the embodiment in which the router 420 did not already average the RSSI values. The location engine 410 may, at 324, use the average signal strength of the RF blasts received by the omni-directional antenna from each router to calculate the relative distance of the tag 430 from each router 420. These distance measurements may, at 326, be used by the location engine 410 to calculate the position of the tag 430, such as by trilateration or as described by the methods 900 and 1000 described below with respect to FIGS. 9 and 10 or by another method. Additionally, the location engine 410 may compile the directional measurements to calculate a location area (referred to as P2 in FIG. 3) in which the tag 430 is located, such as by the method described with respect to FIGS. 6-8, the method 1100 described with respect to FIGS. 11A and 11B, or another method. The position of the tag 430 determined using the omni-directional RSSI values may then be compared to the determined location area of the tag 430. If the position of the tag 430 calculated using the omni-directional RSSI values is within the location area, the position calculated using the RSSI values may be likely correct within meters. Conversely, if the position calculated using the RSSI values is outside of the location area, the location area may be provided as the location of the tag 430, with a degree of error.

Figure 5:
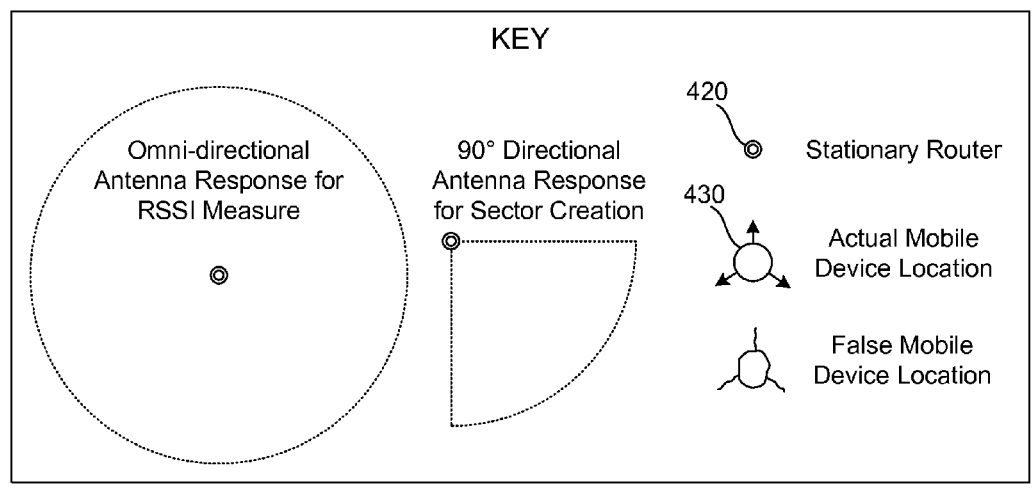
FIG. 5 is a key for use with FIGS. 6-8, in accordance with an embodiment.
Figure 6:
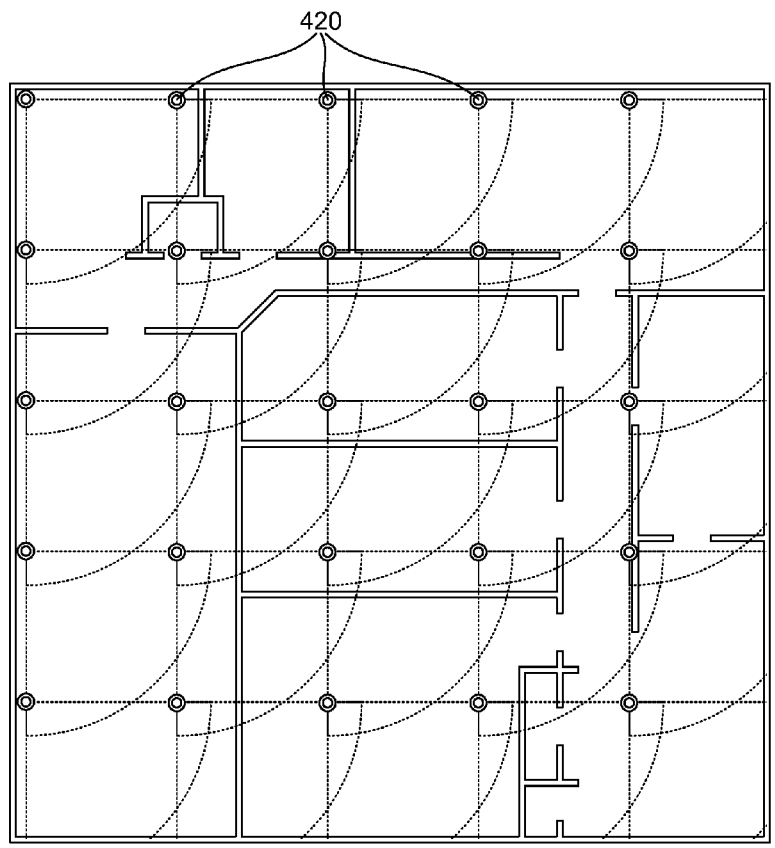
FIG. 6 depicts a 90° directional antenna response in a real-time network node location system, in accordance with an embodiment.
Figure 7:
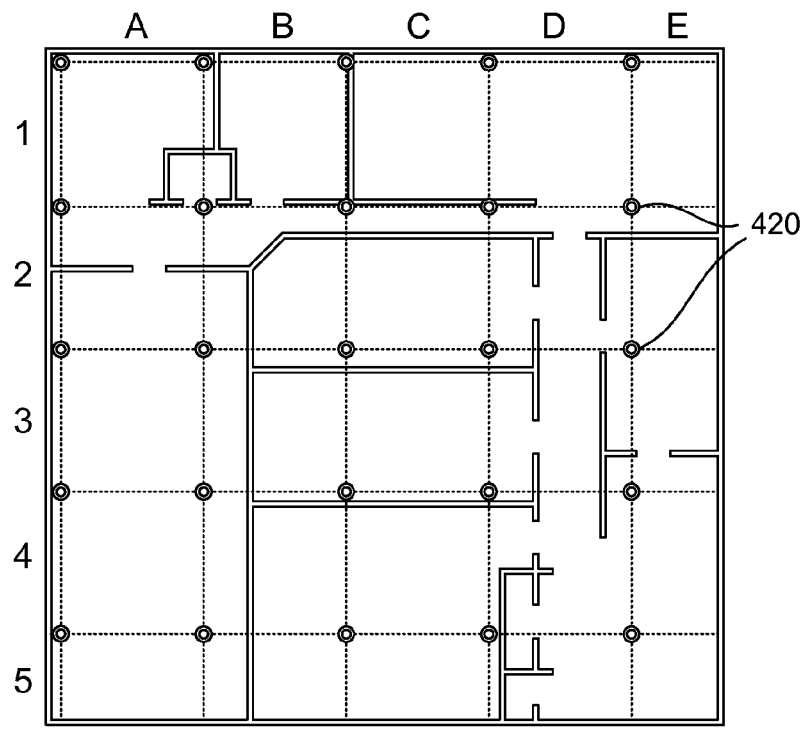
FIG. 7 depicts sector establishment via the 90° directional antenna response of FIG. 6, in accordance with an embodiment.
Figure 8:
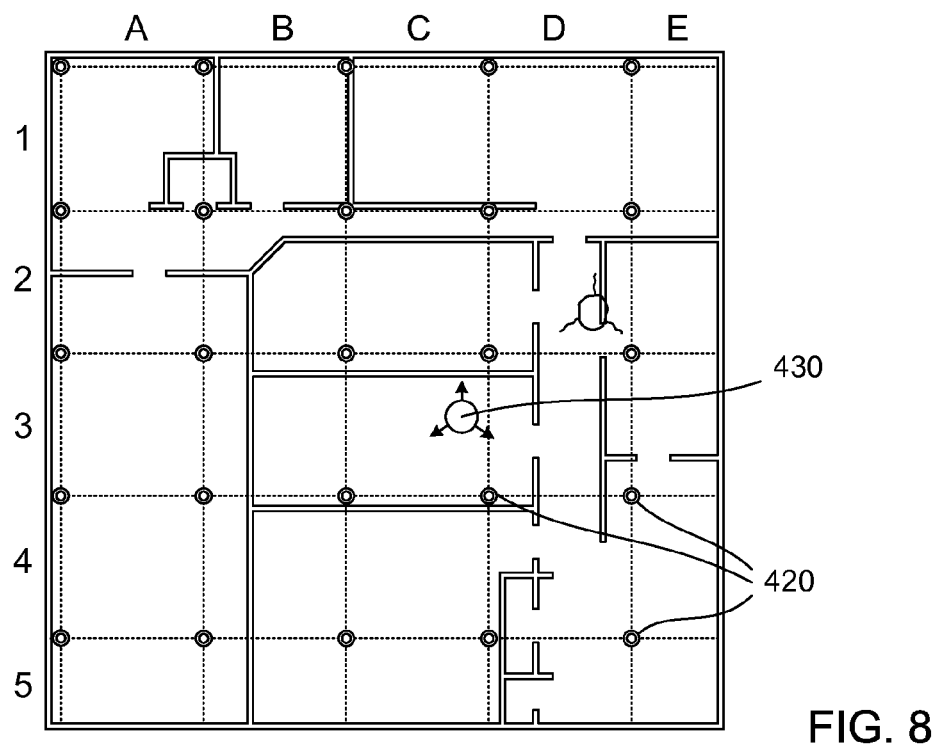
FIG. 8 depicts a directional antenna filtering system of a real-time network node location system, in accordance with an embodiment.

The determined location area may be built on the directional responses of the directional antenna system, as will now be described with respect to FIGS. 5-8, in which FIG. 5 is a key for use with FIGS. 6-8. The omni-directional antenna response for RSSI measure shown in the key is not shown in FIGS. 6-8, and merely demonstrates that the omni-directional antennas of the routers 420 in FIGS. 6-8 can receive blasts arriving from any angle, i.e., any direction. An example for creating such a real-time network node location system is an embodiment with a regular array of 90° antennas, and thus directional antennas with a 90° half-power beamwidth (HPBW). The responses of these antennas superimposed on an example floor plan are shown in FIG. 6, which depicts a 90° directional antenna response in a real-time network node location system, such as the real-time network location system 400, in accordance with an embodiment. It can be seen in FIG. 6 that the directional antennas create overlapping areas of coverage. This serves to create sectors of coverage that can be seen by the checkerboard pattern shown in FIG. 7, which depicts sector establishment via the 90° directional antenna response of FIG. 6, in accordance with an embodiment. These squares of coverage are created by simple comparison. From the overhead view of FIG. 7, each router 420 (using the 90° directional antenna) covers all squares to its right and below, such that each router 420 is positioned at the upper left corner of the upper left square it covers. Thus, for example, the router 420 at the upper left corner of the square C2 covers, or "sees," the squares C2, C3, C4, C5, D2, D3, D4, and D5, whereas the router 420 at the upper left corner of the square C4 covers, or "sees," only the squares C4, C5, D4, and D5. Note, however, that the routers 420 may, in an embodiment, also cover some of the area outside that 90° half-power beamwidth (HPBW), though the drop-off in reception outside that HPBW may be, in an embodiment, significant. In such an embodiment, methods may be used to determine the location and sector of the tag, such as described below with respect to methods 900-1200 of FIGS. 9-12, respectively.

After the tag 430 has sent all of its blasts, each router 420 may determine a signal strength measurement from its omni-directional antenna and the directional antenna. These two measurements may be compared, such as by the location engine 410, to determine whether the tag 430 is inside the 90° HPBW of the directional antenna. This determination may be made for each router 420 and a binary decision may be made as to whether or not the router "sees" the tag 430. As is shown in FIG. 8, which depicts an embodiment of a directional antenna filtering system of a real-time network node location system, routers 420 that are not at the upper left of certain squares (A1, A2, A3, B1, B2, B3, C1, C2, C3) are likely to see the tag 430, whereas all other routers 420 (at the upper left of a shaded square) are not. Additionally, the router 420 at the upper left corner of the square C3 is the highest router to communicate with the tag 430. Therefore, the tag 430 can be said with some reliability to be in or near the square C3. Thus, for example, where an incorrect, ghost position of the tag 430 was determined using signal strength measurements alone, as shown in FIG. 8 in the D2 square, that position may be rejected by the system and the square C3 will be reported as the position of tag 430. Other methods may be used to determine the position of location in other embodiments, as desired.

In an embodiment, the directional antenna of a router may receive blasts outside its HPBW, but the received signal strength of the blasts may be dropped off (or significantly dropped off in an embodiment) outside that HPBW. Thus, in an embodiment, additional routers may "see" the tag, so the returned square in which the tag is determined to be located may be merely near the actual square of location. The possibility of that error in this embodiment may be reduced, such as by using the methods 900-1200 of FIGS. 9-12, respectively, to determine the final position of location of the tag 430. Those methods are described below.

It is to be understood that the aforementioned systems and methods detailed above are only examples of a more reliable location determination based, at least in part, on a directional antenna system. Many different angles can be substituted for the 90° system detailed above in various embodiments. In any of those embodiments, the HPBWs of the directional antennas of the routers may be the same or differ between one or more routers. It is further to be understood that the square pattern shown in FIGS. 6, 7, and 8 is only an embodiment of the various shapes that may be used as sectors, and thus used as areas of location each associated with a router. For example, in various embodiments, the HPBWs of the directional antennas of one or more of the routers may be oriented in different directions. In embodiments in which the HPBWs and/or orientations of the directional antennas of one or more of the routers are different, the area of location associated with each router may be considered an area within the HPBW of its directional antenna. That area of location may be bounded by a selected distance, e.g., radius, from the router, such as the distance to which the nearest router within that HPBW is located, the distance to the perimeter of the selected search area, or any other selected distance or distances. In those embodiments, the areas of location associated with the routers may overlap. In such a case, the determined area of coverage may be considered to be associated with any router that "sees" the tag, as described herein, or the router, among all the routers that "see" the tag, that has the highest average RSSI determined from blasts received with its directional antenna. Such an embodiment may have its area of location and final position calculated, if desired, using the methods 900-1200 of FIGS. 9-12, respectively.

In one embodiment, the HPBWs of the directional antennas of the routers in any of the embodiments herein, such as in the embodiments of one or more of FIGS. 2-8, for example, may be at least substantially 80°, and in another embodiment, at least substantially 85°. As described herein, some directional antennas may be able to receive blasted signals outside of their HPBWs. Those antennas may not have a significant drop-off in the ability to receive those signals before the blasted signals are a number of degrees, such as up to about 10° in an embodiment, outside their HPBWs. In that embodiment, for example, the HPBWs of those antennas may be substantially 80° or greater, up to substantially about 90°, and yet still operate to receive blasted signals as in those embodiments of FIGS. 2-8 or in other embodiments herein.

In other such embodiments, the HPBWs of the directional antennas of the routers may be at least about 80° or substantially about 90° and oriented in the same direction, but the routers may be variously positioned such that areas of location of those routers vary. The routers in those embodiments may be aligned such that one or more of the columns A-B and/or rows 1-5 have different widths.

FIG. 9 is a flow chart outlining a method 900 of calculating multipath parameters for use in determining an omni-directionally calculated position of a tag (e.g., tag 430), such as described in the method 1000 of FIG. 10 below, in accordance with an embodiment. The method 900 may calculate the multipath parameters, as described below, without use of a tag. The method 900 may be used, in an embodiment, in a real-time network node location system, such as described herein with respect to FIGS. 2-8, including the real-time network node location system 400, for example. The method 900 may be used, in an embodiment, by the location engine 410 described herein or another location engine. The multipath parameters may be used in the method 900, in an embodiment, in one or more equations to approximate distances and determine a position of location of a tag or router from signal strength measurements determined by the omni-directional antenna of one or more routers, such as one or more routers 420 described herein. In an embodiment, the one or more equations involve two multipath parameters, a path loss exponent (n) and a path loss constant (A).

In an embodiment, at 902, a location engine sends a location request, initiated by a user prompt or automatically by polling, for example, to a specific router. As described with respect to FIG. 4 above, if the real-time network node location system the method 900 is used with is a mesh network, the location request may be sent via short hops between routers, instead of directly, to the specific router. At 904, the specific router may receive the location request and send a designated number of blasts for the other routers to receive by their omni-directional patterns that are envisioned. Thus, the routers 420 may be set in different locations and may have directional antennas with various fields of view, and thus various areas of coverage.

In an embodiment, before those blasts are transmitted, the specific router that received the location request at 902 may broadcast to the other routers, such as at 308 of FIG. 3, for example, that it is ready to send blasts to the other routers for use in measuring omni-directional signal strength. The other routers may then enable their omni-directional antennas. In another embodiment, however, the other routers may already have their omni-directional antennas enabled.

One or more other routers may, at 906, receive and collect the blasts (RF signals) with their omni-directional antennas and each determine a signal strength, such as an RSSI, for each of those received signals. Depending on the distances between the other routers, as well as environmental and other factors that may affect transmission of the blasts, one or more of the other routers may be out of the range of the blasts and thus not receive the blasts. In an embodiment, the other routers that receive the blasts may take an average signal strength measurement from the RSSIs of all the signals received. Those determined omni-directional RSSIs, or average RSSI in an embodiment, may be stored on those other routers until all of the information is collected and, as described below, the directional measurement is taken.

The router (that had sent the blasts at 904) or the location engine may then, at 908, broadcast a command to all other routers to be ready to receive blasts by their directional antennas, and thus to switch over to the directional system. The other routers may, at 908, enable their directional antennas. The router may, at 910, blast a designated number of times. One or more other routers may, at 912, receive and collect the blasts (RF signals) with their directional antennas and each determine a signal strength, such as an RSSI, for each signal. As described above at 906, depending on distance from the blasting router and environmental and other factors, one or more of the other routers may not receive the blasts. In an embodiment, each of the other routers that receive the blasts may average those directional RSSIs.

The other routers that received the blasts may, at 914, send information identifying both signal strength measurements, e.g., omni-directional and directional RSSIs, to the location engine. Alternatively, in the embodiment in which the other routers averaged the RSSI values, each of the other routers may send a signal identifying the average omni-directional and directional RSSIs to the location engine. Additionally, because the position of all the routers may be known, each of the other routers that received the blasts may, at 914, also send a signal that identifies its position, e.g., the three-dimensional position (x, y, z), or some identification of that other router if the location engine already has the positions of the routers stored or can access them. In one embodiment, only the other routers on the same floor (of a building in which the routers may be located) as that of the blasting router may be considered in the method 900, and thus only the two-dimensional position of those other routers may be sent if not already stored on, or otherwise accessible by, the location engine. Additionally, the blasting router may send, or may have sent at any time, a signal to the location engine providing information identifying its three-dimensional or two-dimensional position if that information is not already stored on, or otherwise accessible by, the location engine.

At 916, the location engine may receive the RSSIs the other routers transmitted at 914. In an embodiment, the location engine may receive those RSSIs via a ZigBee coordinator if the system is operative in compliance with the ZigBee protocol. At 918, the location engine determines if at least three of the other routers received the blasts, and thus whether at least three other routers sent information identifying RSSIs and possibly their position, as described above at 914, to the location engine. If not, then, at 920, the location engine may return to 902 to send a new location request. If at least three other routers did respond and send the aforementioned information at 914, then, at 922, the location engine may keep the received position, omni-directional RSSIs, and directional RSSIs.

In various embodiments, 918, 920, and 922 is otherwise performed as described above, but the determination and subsequent associated function is performed with respect to whether at least one other router (as opposed to at least three other routers) received the blasts. In one or more of those embodiments, there may be at least three routers total in the system, and at least three of those routers may be used in one or more of the methods, such as the methods 1000 and 1100 of FIGS. 10 and 11, respectively.

If the received omni-directional RSSIs were not separately averaged by each other router, as described above, the location engine, in an embodiment, at 924, filters out (discards) outlying or very low omni-directional RSSIs. Thus, the location engine, at 924, may filter out omni-directional RSSIs that were, for each other router, much lower or otherwise much different (e.g., off more than one standard deviation or another determined difference) in omni-directional RSSI value than the rest of the omni-directional RSSI values collected by that other router. The average RSSI for each router may thus be considered the average of the RSSIs of all blasts received with the omni-directional antenna of that router and not filtered out in one embodiment, though in another embodiment, the average may be that of all of those RSSIs for that router.

In an embodiment, at 926, the location engine may, if the omni-directional RSSIs were not separately averaged by each other router, as described above, average the omni-directional RSSIs for each router.

If desired, in an embodiment in which the directional RSSIs were not averaged by each other router, as described above, 924 and 926 may be performed to filter outlying or very low directional RSSIs and then average the remaining directional RSSIs for each other router.

After 926, multipath parameters may be optimized in various embodiments using a desired optimization algorithm or algorithms, such as an RF signal propagation model equation, which is considered herein to encompass one or more equations. For example, in an embodiment, at 928, multipath parameters are optimized to best fit an RF propagation model equation, such that the router that sent the blasts is calculated close to its actual position, such as close as possible to its actual position, subject to the constraints of that optimization process. The multipath parameters may be a path loss exponent (n) and a path loss constant (A) that accounts for system losses. Those multipath parameters n and A may be optimized using, at least in part, an equation such as, in an embodiment, the following path loss equation:

$$L = 10n \log_{10}(d) + A$$

Other equations may be used in other embodiments. In the equation above, for each other router, L is the average path loss of signal strength from the signals the blasting router sent at 904 to the signals received by the omni-directional antenna of the other router. Since the signal strength (and thus average signal strengths) of the blasts are known, and the average omni-directional RSSI from each other router has been determined in the method 900, e.g., at 926, the average path loss L may be the difference between those average signal strengths. Since the distance (d) between the blasting router and the other router that received the blasts is known, the path loss exponent n and path loss constant A may be optimized by repeatedly calculating a distance d by running the path loss equation above, using a trial path loss exponent n and trial path loss constant A, with respect to each other router that received the blasts. The calculated distance d and the error in that distance with respect to the actual, known distance between each blasting router and blast-receiving router may then be applied in the method 1000, as described below with respect to FIG. 10, to calculate a position of the blasting router. In an embodiment, the average error between the calculated distances d and actual distances between the blasting router and each of the other, blast-receiving routers may be determined and applied in the method 1000, such that the average error is used as the error in the distance between all routers. The process at 928 may be repeated, each time with a new trial path loss exponent n and path loss constant A until the error in the calculated position of the blasting router is minimized and n and A are thus optimized, subject to the constraints of that optimization process. That optimized path loss exponent n and optimized path loss constant A may be used in the combined method of methods 1000-1200 described below with respect to FIGS. 10-12, respectively, in determining a final position of a tag 430 or other tag. The final position may be close, or as close as possible, subject to the constraints of any of the embodiments of that combined method, to the actual position of the tag.

In another embodiment of 928, the optimization process described above may be performed and for each trial path loss exponent n and path loss constant A, the calculated distances d and errors (or average error) with respect to the actual distances may be used in the method 1000 as described above. But in this embodiment, the method 1100 of FIGS. 11A and 11B may be additionally applied by the location engine in determining a position of the blasting router. Again, the process in this embodiment may be repeated, each time with a new trial path loss exponent n and path loss constant A, until the error in the calculated position of the blasting router is minimized and the path loss exponent n and path loss constant A are thus optimized.

In other embodiments, the method 900 from 902 to 926 may be repeated, which may include the process described below with respect to 930 and 932, each time such that a different router will send blasts to the other routers, and appropriate data will be collected and processed as described. The embodiments described above at 928 may then be used to optimize the path loss exponent n and path loss constant A separately for each blasting router with respect to either all blast-receiving routers or only the blast-receiving routers within a selected region. Thus, in an embodiment, the path loss exponent n and path loss constant A may be different for each router.

In other embodiments, the method 900 from 902 to 926 may be repeated after determining at 930 that all routers have not been located and then initiating a location request at 932, each time with a different router. But, at 934, the embodiments at 928 may then be used to optimize the path loss exponent n and path loss constant A for all the blasting routers together or all the blasting routers together in a specified region. In that case, the optimization process may minimize, in an embodiment, the sum of the square of the errors in the calculated position and actual distance between every specified router with respect to each other specified router. In that case, the path loss exponent n and path loss constant A may be the same for all specified routers. However, any other optimization process may be used as desired.

Another embodiment for optimizing the multipath parameters is at 936. In that embodiment, the path loss equation above may be applied to optimize the path loss exponent n and path loss constant A to best fit an RF propagation model equation, such that the router that sent the blasts is calculated close to its actual distance, such as close to its actual position as possible, subject to the constraints of that optimization. In that embodiment, since, again, the signal strength of the blasts sent by a router and received by omni-directional antennas of other routers is known, and the average omni-directional RSSI from each other router has been determined in the method 900, e.g., at 926, the average path loss L may be the difference between those average signal strengths and may be known. Since the distance d between the router that transmitted the blasts and each other router that received the blasts is known, the path loss exponent n and path loss constant A may be optimized by repeatedly calculating a distance d by running the path loss equation above, using a trial path loss exponent n and trial path loss constant A, with respect to each other router that received the blasts. In an embodiment, the sum of the squares of the errors between each calculated distance d and the actual, known distance between the blasting router and blast-receiving router may be determined. That process at 936 may be repeated, each time with a new trial path loss exponent n and path loss constant A, until the resulting sum of the squares of the distance errors has been minimized, and thus the path loss exponent n and path loss constant A has been optimized. Other optimization processes may be used as desired.

As with the process at 928, in other embodiments, before 936, the method 900 from 902 to 926 may be repeated, along with 930 and 932 as described above, each time such that a different router will send blasts to the other routers, and appropriate data will be collected and processed as described. Then, in one embodiment at 936, the path loss exponent n and path loss constant A can be optimized separately for each blasting router with respect to either all blast-receiving routers or only the blast-receiving routers within a selected region. Thus, the path loss exponent n and path loss constant A may be different for each router. In another such embodiment at 936, the path loss exponent n and path loss constant A can be optimized for all the routers together in a region or all the routers. In that case, in an embodiment, the sum of the squares of the errors for all the specified routers with respect to all those routers may thus be minimized. The path loss exponent n and path loss constant A may thus, in that case, be the same for all specified routers. However, any other optimization process may be used as desired.

In any of the embodiments above, if desired, the path loss constant A may be held constant throughout the optimization process. Thus, the path loss constant A may be chosen, then left unchanged such that only the path loss exponent n is changed during the optimization process. That process is still considered, in an embodiment, optimizing multipath parameters.

At 938, with respect to any of the embodiments at 928, 934, and 936, the determined path loss exponent n and path loss constant A may be used by the location engine to locate a tag 430 or other tag, as described below in the processes 1000-1200 of FIGS. 10-12, respectively, for the entire search area or individual sectors or another area.

FIG. 10 is a flow chart outlining a method 1000 of determining an omni-directionally calculated position of a tag, in accordance with an embodiment. The method 1000 may be used, in an embodiment, in a real-time network node location system, such as described herein with respect to FIGS. 2-8, including the real-time network node location system 400, for example. As with the method 900 of FIG. 9, the method 1000 may be used, in an embodiment, by the location engine 410 and with one or more routers 420 and a tag 430.

In an embodiment of the method 1000, the process at 1002 through 1026 may proceed the same as or similarly to the method 900 of FIG. 9 from 902 through 926, respectively, except that in the method 1000, a tag, instead of a router, sends the blasts. If desired, then additionally at this time, at 1023, the location engine may determine a sector or other area in which the tag is located, such as by trilateration or as described below with respect to the method 1100 of FIGS. 11A and 11B.

The multipath parameters determined by the method 900 of FIG. 9, the path loss exponent n and path loss constant A, may be input at 1028 into the RF signal propagation model equation or equations at 1030. At 1030, the location engine may calculate an approximate distance between the tag and each router that received the blasts from the tag using an RF signal propagation model equation. Depending on the embodiment, the path loss exponent n and path loss constant A may be the same or different for each router. In an embodiment, that equation may be the path loss equation ($L=10 \, n \, \log_{10}(d)+A$)) described above. In that equation, since the path loss L is known (in addition to the optimized path loss exponent n and path loss constant A) for each router, the distance d from each router to the tag may be calculated. For each router, the final errors in the distance between that router and the other routers that received its blasts or a final average error in the distance between that router and the other routers, as determined in the method 900 of FIG. 9, may be applied, at 1032, in a probability density function (e.g., having a normal distribution) schematically to a search area array in a ring around that router. Peaks in the ring may be present at array positions representing the calculated tag radial distance. A density function may be positioned perpendicular to the ring and may have a width related to the aforementioned final distance error or average distance error, such as double the error width or another width. This process at 1032 may be repeated for all routers, and their resulting rings with peaks and density function may be superimposed in the search area array. If needed or desired, the search area array, which may represent a designated search area, may, before at 1034, have all values set to zero. In this embodiment, the routers and tag may be located on the same floor, though in another embodiment in which the tag and routers are not all located on the same floor, a probability density function for determining three-dimensional position of the tag or another desired equation may be used.

The final errors for each router or average error applied at 1032 above may be determined at 928, 934, or 936 of FIG. 9, for example, or by the same or another method that determined final errors or a final average error in distances between the blasting router and blast-receiving routers when the path loss exponent n and path loss constant A were optimized in the method 900.

At 1036, the location engine may search the search area array to find the overall peak value. At 1038, the location engine may determine the location of that peak value as the omni-directionally calculated position of location of the tag.

In one embodiment, the methods 900-1200 of FIGS. 9-12 may not all be performed to determine the final position of location of the tag. In this embodiment, only the methods 900-1000 of FIGS. 9-10 may be performed, and the position of location determined at 1038 may be considered the final position of location of the tag.

In various embodiments of the method 1000 of FIG. 10, the search area may be all or a portion of the total search area. If the search area is selected to be just a portion of the total search area, the method may be limited to the routers positioned within that selected portion.

Figure 11A:
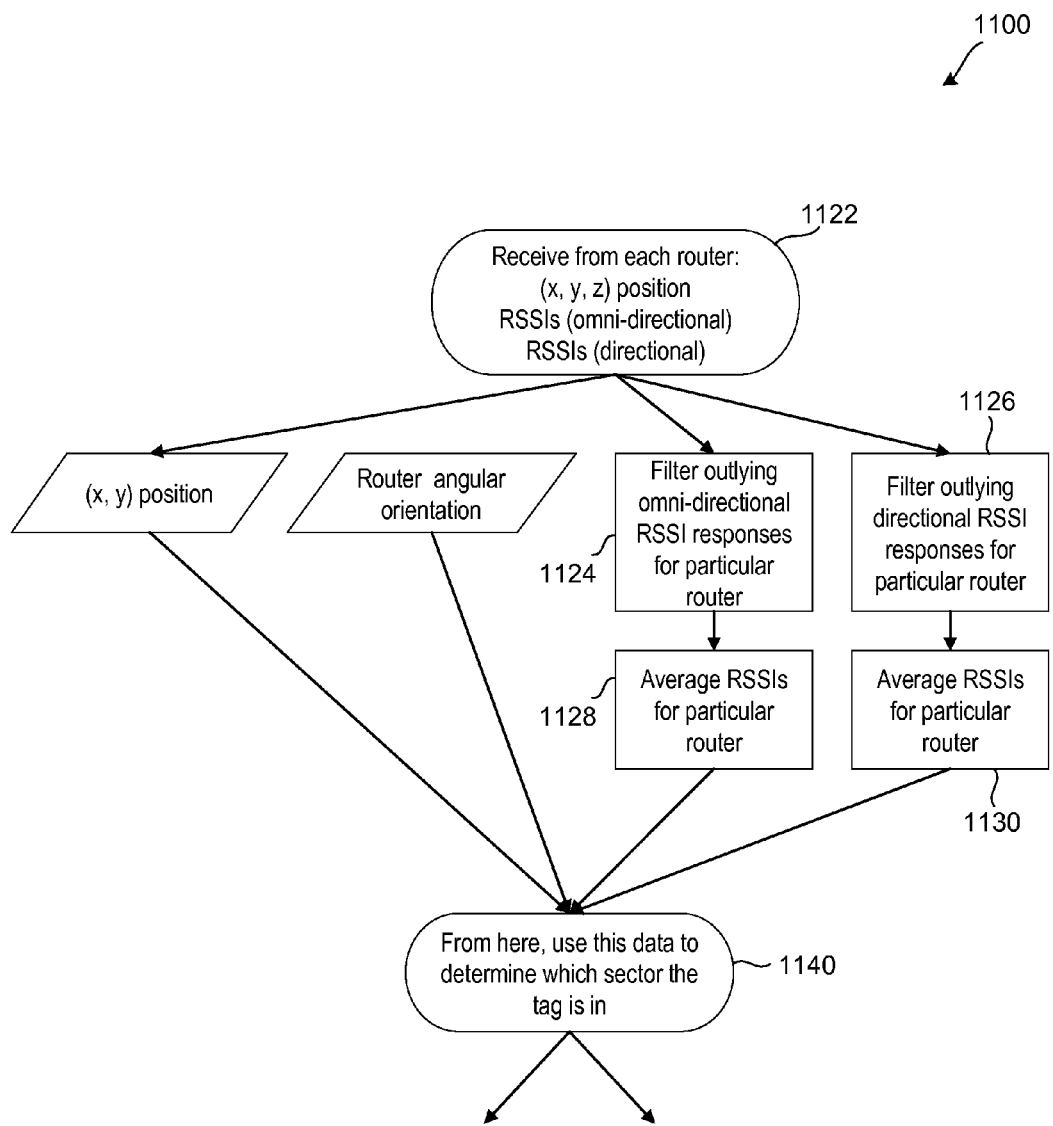
FIGS. 11A-11B are a flow chart outlining a method of determining an area of location of the tag, in accordance with an embodiment.
Figure 11B:
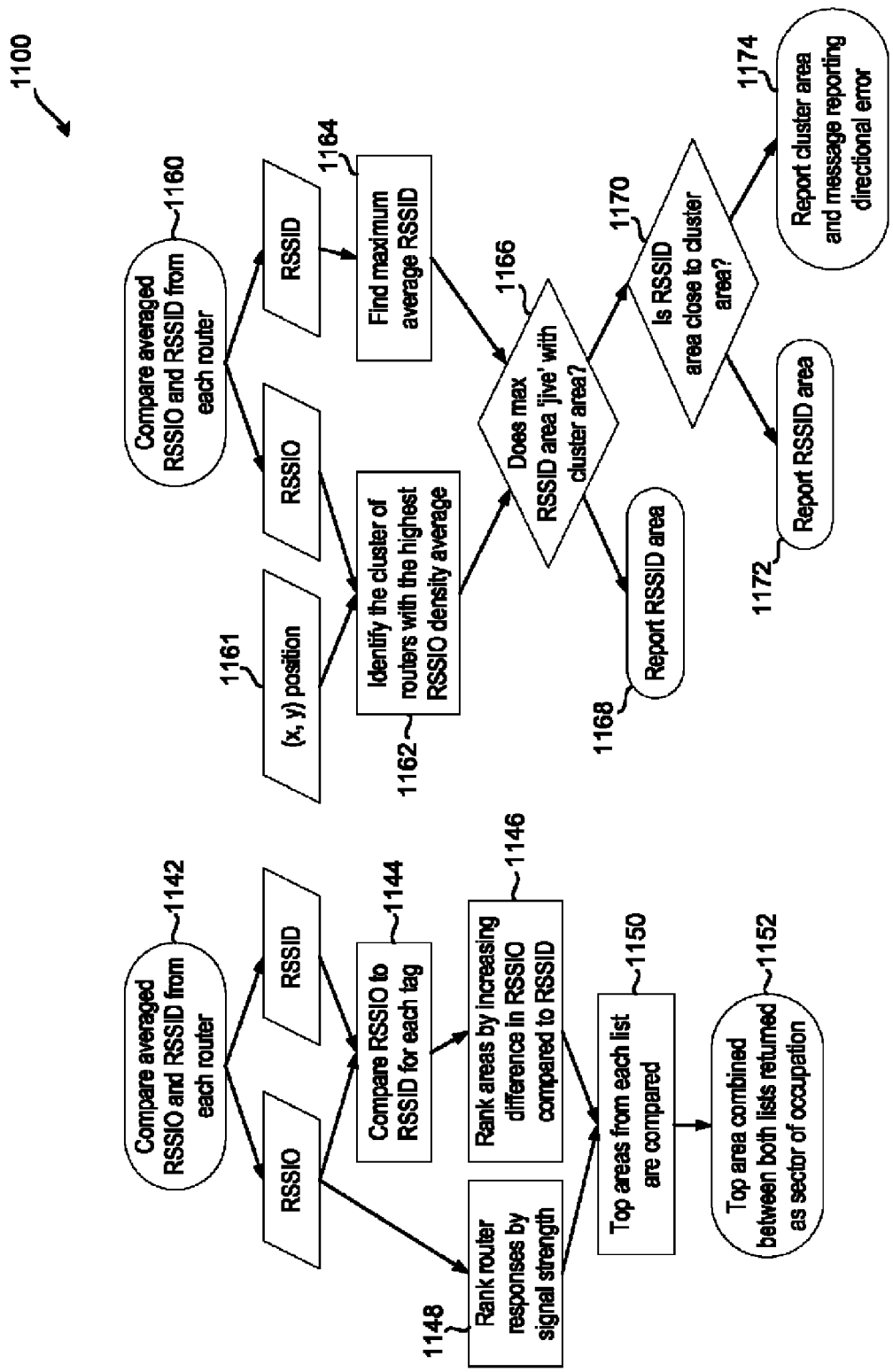

FIGS. 11A and 11B are a flow chart outlining a method 1100 of determining an area of location of the tag, in accordance with an embodiment. The method 1100 may be used, in an embodiment, in a real-time network node location system, such as described herein with respect to FIGS. 2-8, including the real-time network node location system 400, for example. As with the methods 900 and 1000 of FIGS. 9 and 10, respectively, the method 1100 may be used, in an embodiment, by the location engine 410 and with respect to one or more routers 420 and a tag 430.

In an embodiment of the method 1100, the method 1100 may proceed the same or similar as that of the method 900 of FIG. 9 from 902 through 916, except that in the method 1100, a tag, instead of a router, sends the blasts to all of the routers. After those parts of the method have proceeded, at 1122, the location engine may receive, from each router, a position ((x,y,z) for multi-floor positioning or (x, y) for single floor positioning), omni-directional RSSIs, and directional RSSIs. However, that information may have already been provided at 1023 of FIG. 9 by the three or more routers that responded, at 1018, to the location request. As described above with respect to the methods 900 and 1000 of FIGS. 9 and 10, respectively, the routers may, in an embodiment, average the omni-directional RSSIs and average the directional RSSIs and send those average RSSIs to the location engine.

If the received omni-directional and directional RSSIs were not separately averaged by each router, the location engine, in an embodiment at 1124 and 1126, filters out (discards) outlying or very low omni-directional and directional RSSIs. Thus, the location engine, at 1124 and 1126, may filter out omni-directional and directional RSSIs that were, for each router, much lower or otherwise much different (e.g., off more than one standard deviation or another determined difference) in omni-directional and directional RSSIs than the rest of the omni-directional and directional RSSIs collected by that router. At 1128 and 1130, the location engine may average, for each router, the omni-directional RSSIs and directional RSSIs that were not filtered out.

The location engine, at 1140, may use the router positions, average omni-directional and directional RSSIs, and the angular orientations of the routers in one of multiple embodiments of a method to determine a sector or other area, within the search area, in which the tag is located. The angular orientations of the routers may be known and defined by the half-power beamwidths (HPBW) of the directional antennas connected to the routers. In an embodiment, the HPBWs of the directional antennas of the routers may be 90° and oriented in the substantially the same direction, such as shown and described with respect to FIGS. 6-8. The ability of the directional antennas to receive blasts may drop off (significantly in an embodiment) outside their HPBWs. However, the directional antennas may still receive blasts outside the HPBW, and the combined method of methods 900-1200 of FIGS. 9-12, respectively, may reduce the likelihood of determining an incorrect area of location (e.g., a square in the embodiment of FIGS. 6-8 or another area of location such as described herein) of the tag.

In one embodiment of the method of determining the area in which the tag is located, the location engine may, at 1142, for each router, prepare to make comparisons between the average omni-directional and/or directional RSSIs (labeled RSSIO and RSSID in FIG. 11A). At 1144, the location engine may compare the average omni-directional and directional RSSIs for each router. At 1146, the location engine may rank the areas of location by ranking the associated routers by increasing difference in average omni-directional and directional RSSI. Thus, for example, the least such difference has the highest rank. In an embodiment, the routers receive a value from zero to X minus one, with zero as the highest rank and X minus one as the lowest, where X equals the number of routers that received blasts to determine both omni-directional and directional RSSIs and were not discarded. An area of location may be determined as desired by placement of the routers, such as shown in FIGS. 6-8, for example, or otherwise as discussed. In other embodiments, as explained above, the routers may have directional antennas having varied HPBWs that may or may not all be oriented in substantially the same direction. In those embodiments, as explained above, the area of location associated with each router may be some selected area within its HPBW, may differ with respect to the area of location of other routers, and may overlap with the area of location associated with one or more other routers.

As an example of the method 900 at 1144 and 1146, a tag may be positioned within the directional area of location of that router. The omni-directional RSSI between the tag and this router may be minus 40 dBm (power in decibels referenced to one milliwatt), for example. The directional RSSI might be minus 32 dBm, since there may be a gain difference in this direction of 8 dBm, increasing the directional RSSI by 8 dBm. If that tag had been outside of the directional antenna's HPBW, but the directional antenna still received that signal, the directional RSSI might have been minus 42 dBm. This is because there may be an 8-dBm difference in antenna gain between the omni-directional antenna and directional antenna. In such a case, the directional average RSSI may be attenuated by 8 dBm, so if the tag is positioned close to a router and within that router's area of location, the omni-directional and directional RSSI determinations from the received blasts would be about minus 40 dBm, whereas if the tag were out of the area of location, the omni-directional RSSIs may still be minus 40 dBm while the directional RSSIs would be about 50 dBm. In other embodiments, those dBm numbers and the extent of attenuation will differ. This attenuation can be done, for example, on the location engine in hardware or in software. This attenuation may be excluded in other embodiments.

As explained above, some routers may not receive directional RSSIs, or may receive very low directional RSSIs, if the blasts from the tag to those routers were not transmitted within the HPBW. Thus, some routers may have very large differences between their average omni-directional and directional RSSIs, and their associated areas may be discarded, in an embodiment, as possible areas in which the tag may be located. In an embodiment, the areas of location of routers having such differences of at least 3 dBm are discarded. In other embodiments, such differences of at least between 8 and 10 dBm are discarded. The minimum difference in dBm for discarding may be selected as desired.

At 1148, the routers are ranked by average omni-directional RSSI, such that the highest RSSI has the highest ranking In an embodiment, the routers may receive a value from zero to X minus one, with zero as the highest rank and X minus one as the lowest, and where X equals the number of total routers that received blasts to determine both omni-directional and directional RSSIs and were not discarded. At 1150, the routers from each ranked list, i.e., the ranked routers determined at 1146 and the ranked routers determined at 1148, are compared. At 1152, the overall top ranked router (and associated area of location) combined between both lists is returned as the area of location, associated with that router, in which the tag is located. In an embodiment, the overall top ranked router is determined to be the router having the lowest sum between the ranked lists, e.g., a router with zero at 1146 and one at 1148 for a total of one when no other router has a sum less than two. If two routers tie for the lowest sum, the areas of location associated with those routers may be returned as two of the possible areas of location.

In an embodiment for determining the area in which the tag is located, alternative to the method at 1142 through 1152, the location engine may, at 1160, for each router, compare the average omni-directional and directional RSSIs. At 1162, a cluster of routers, with each router identified by an inputted position (e.g., (x, y)) at 1161, having the highest omni-directional RSSI average is identified. In one embodiment, in which the routers are positioned in a grid as shown with respect to FIGS. 6-8, for each router, a cluster may be that router and the eight most closely surrounding routers. At 1164, the router with the maximum average directional RSSI, and its associated area, is determined. At 1166, the location engine determines if that area associated with the maximum average directional RSSI is within the perimeter of the cluster, e.g., within the four squares, in FIG. 6 for a router, that its eight most closely surrounding routers surround, or, in an embodiment, overlaps that area, or, in another embodiment, is within the areas of location of any of the eight surrounding routers. If so, then that area associated with the maximum average directional RSSI is reported, at 1168, as the area in which the tag is located. If not, then, at 1170, if that area associated with the maximum average directional RSSI is closest to that cluster, then that area is reported, at 1172, as the area of location of the tag. If that area is not close to the cluster, then at 1174, the cluster area is reported as the area in which the tag is located and a message reports that there is a directional error.

Figure 12:
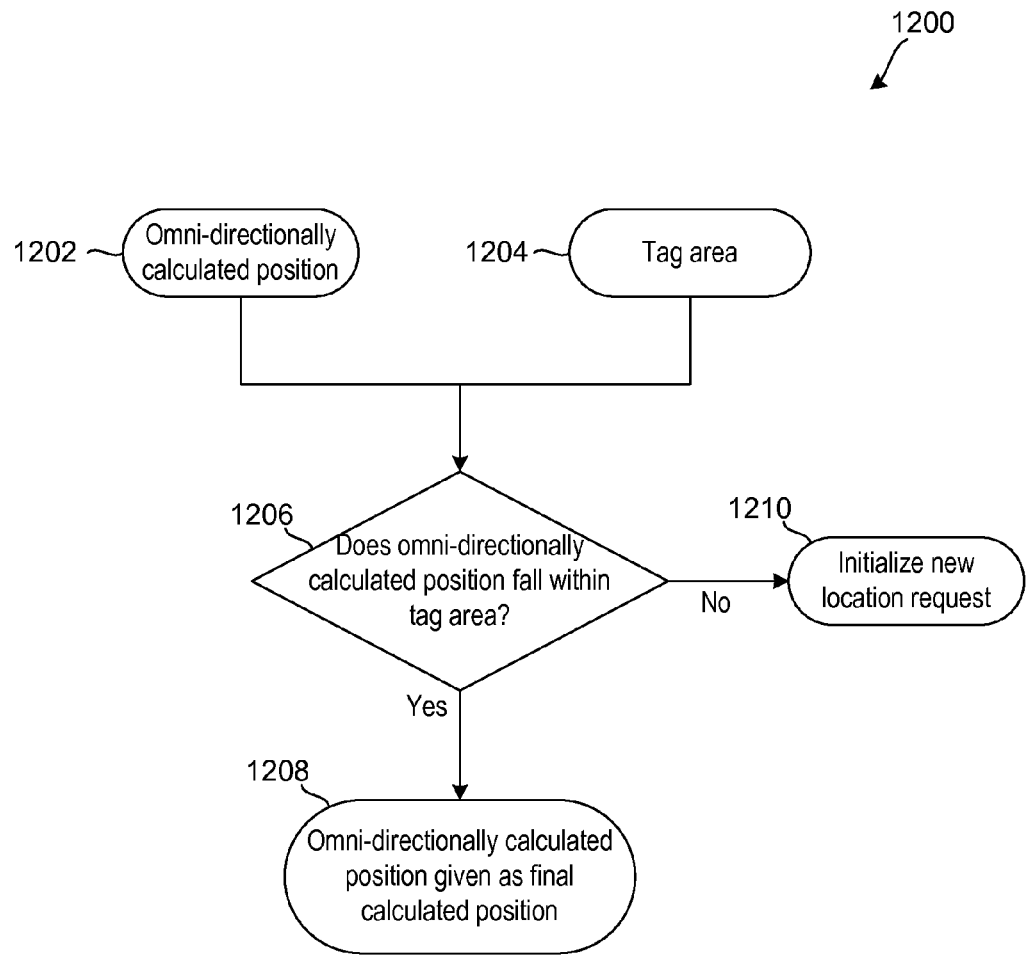
FIG. 12 is a flow chart outlining a method of calculating a final position of a tag using omni-directionally calculated position and location area, in accordance with an embodiment.

FIG. 12 is a flow chart outlining a method 1200 of determining a final position of a tag using the omni-directionally calculated position and location area, in accordance with an embodiment. In this embodiment, the omni-directionally calculated position at 1202 and location area at 1204 are input for comparison. The location engine may, at 1206, compare the omni-directional position of the tag determined by using the methods 900-1000 of FIGS. 9-10, respectively, and the sector or other area of location in which the tag is located as determined by the method 1100 of FIG. 11. If that omni-directional position falls within that area of location, then, at 1208, that omni-directional position is given as the final position of location of the tag. If that omni-directional position does not fall within that area of location, then, at 1210, the methods 900-1100 of FIGS. 9-11, respectively, may be repeated, and then the method 1200 may be repeated. Other methods may be used, as desired, to determined the final position of location of the tag As described with respect to the method 1100 of FIGS. 11A and 11B at 1152, if two routers tie for the lowest sum, the areas of location associated with those routers may be returned as two of the possible areas of location. In that case, then at 1206, both of those areas of location can be compared with the omni-directional position of location at 1206. If that omni-directional position falls within either area of location, then, at 1208, that omni-directional position may be given as the final calculated position of the tag. If that omni-directional position does not fall within either area of location, then, at 1210, the methods 900-1100 of FIGS. 9-11, respectively, may be repeated, and then the method 1200 may be repeated.

In any of the embodiments described herein, the omni-directional and directional antennas, in an embodiment, may be embodied in a single device. Thus, where the omni-directional and directional antennas are discussed herein, those antennas may be considered separate devices or just a single device that can switch its function between that of an omni-directional and directional antenna. An embodiment of such a single device is a smart antenna.

In any of the embodiments herein, the signals sent in the form of blasts by a router (e.g., in the method 900 of FIG. 9) or a tag, in an embodiment, may be sent as a single set of blasts that may be received by both the omni-directional and directional antenna of each router. In that case, the omni-directional and directional antennas may both be enabled. In an alternative embodiment, a single set of blasts may be sent, but at least a first part of those signals may be received by the omni-directional antenna, and at least a second part may be received by the directional antenna. The first part of the signals may be different than, the same, or partly the same (i.e., some but not all signals are the same) as the second part of the signals. Receiving "at least" a first or second part of the signals means receiving one or more, up to all, of the total blast signals broadcast by the router or tag.

In any of the embodiments herein, the omni-directional antenna and/or directional antenna may be already enabled, and thus may not need to receive a command, such as from the tag or router, to enable either antenna.

Additionally, in any of the embodiments described herein, each router may have more than one omni-directional antenna and/or more than one directional antenna. In such an embodiment, the blasts may be received by each of the omni-directional and/or directional antennas. In such an embodiment, each omni-directional antenna and each directional antenna of each router may receive a part of the blast signals sent from a router (e.g., in the method 900 of FIG. 9) or a tag, as described herein. The first part may be different for each omni-directional antenna and the second part may be different for each directional antenna.

For example, in an embodiment in which a router has two or more directional antennas, those antennas may each receive at least a part of the blasts, and those parts may be different, the same, or partly the same. In that embodiment, the two or more directional antennas may each determine RSSIs and send those RSSIs to the location engine. The location engine may average the RSSIs for each of the two or more directional antennas. The location engine may then treat, such as in any of the embodiments herein, each average RSSI and associated directional antenna from one router as belonging to a different router having the same location. In that embodiment, the location engine may use the omni-directional RSSIs with each such "different router" (i.e., with each directional antenna on one router being treated as another router) in any of the determinations herein, such as, for example, determining a location of a tag through the combined methods 900-1200 of FIGS. 9-12, respectively. In an embodiment in which the two or more directional antennas of a router have substantially the same HPBWs oriented the same way, the location engine may determine one average for all the RSSI readings combined for all the directional antennas and treat that average as belonging to just a single router.

In another embodiment, a router has two or more omni-directional antennas. Those antennas may each receive at least a part of the blast signals, and those parts may be different than each other, the same, or partly the same. In that embodiment, as with the directional antennas, each omni-directional antenna may determine RSSIs for the blast signals and send those RSSIs to the location engine. In one embodiment, the location engine determines one average for all the RSSI determinations for all omni-directional antennas of the one router or, in another embodiment, the location engine averages the RSSI readings from one or more, but not all, of the omni-directional antennas. The location engine may then use that average omni-directional RSSI in any of the determinations herein, such as, for example, determining a location of a tag through the combined methods 900-1200 of FIGS. 9-12, respectively. In another embodiment in which a router has multiple omni-directional antennas, the location engine determines an average RSSI for each of those antennas and, as with one embodiment of a router having multiple directional antennas as described above, treats each average RSSI as belonging to an omni-directional antenna of a different router in any determination herein.

Embodiments described herein may reduce error affecting signal travel indoors, and may thus improve the accuracy of locating a tag in buildings and other structures.

Various other embodiments may be included, and may be included in one or more of the aforementioned embodiments. For example, in an embodiment, the present invention includes a wireless real-time location system that uses signal strength and angle information to calculate mobile device location, the system including (a) a plurality of stationary wireless network routers that utilize omni-directional and directional antennas to measure signal strength from mobile devices and to identify an angle that mobile devices are from each router; (b) mobile devices to be tracked capable of broadcasting signals to said stationary wireless network routers for signal strength measurements and angle determination; and (c) a network node acting as a location processor that receives signal strength and angle information from stationary routers of known locations and subsequently computes mobile device location.

The stationary wireless network routers may use multiple omni-directional antennas or multiple directional antennas or both. A phased array of antennas may be used to form a directional beam.

The signal strength measurements may be used to determine the RSSIs. Any communication signals transmitted by the mobile devices may be used by stationary routers for signal strength measurements and angle determination. In an embodiment, the location processing may occur on the mobile devices upon receipt of signal strength and angle information from stationary routers. The location processing may occur on designated stationary routers in a distributed fashion. The location processor, which in an embodiment may be the location engine as described herein, may be operative for processing the maximum likelihood estimation for determining location probabilities using signal strength information. The location processor may be operative for processing the maximum likelihood estimation for determining location probabilities using measurements from directional antennas.

Mobile devices may be located automatically according to a regular time cycle or a regularly occurring event. Mobile devices may be located when polled by a physical stimulation on the mobile device or a wireless signal sent to a mobile device from another network device. The network devices may communicate and may be operative in compliance with the IEEE 802.15.4 standard. The network devices may communicate and may be operative in compliance with the ZigBee protocol.

Physical stimulation on the mobile device may come from the press of an actuator (e.g., button) or may be information from a connected sensor.

Angle determination of the directional antennas may be defined by the half-power beamwidths (HPBWs) of the antennas connected to stationary wireless network routers. The HPBW may be ninety degrees or another angle.

In an embodiment, a wireless real-time location system may include (a) a plurality of stationary wireless network routers that utilize omni-directional antennas for typical network communication as well as to measure the signal strength from mobile devices; (b) directional antennas individually connected to said stationary wireless network routers and activated to measure the signal strength from mobile devices to determine direction; (c) mobile devices to be tracked that broadcast signals to said stationary routers for signal strength measurements and directional antenna readings; and (d) a network node acting as a location processor that receives signal strength measurements resulting from said omni-directional antennas, signal strength measurements resulting from said directional antennas, and the known locations of responding said stationary routers. The directional antennas may have HPBW of ninety degrees or another angle.

The invention has been described with reference to the desirable embodiments. Modifications and alterations will occur to others upon reading and understanding the preceding detailed description. It is intended that the invention be construed as including all such modifications and alterations insofar as they come within the scope of the appended claims or the equivalents thereof.

What is claimed is:

1. A real-time network node location system, comprising:
    a tag to broadcast a plurality of signals;
    a plurality of routers each comprising at least one omni-directional antenna to receive at least a first part of the plurality of signals and at least one directional antenna to receive at least a second part of the plurality of signals, the plurality of routers to transmit information identifying signal strengths of the at least the first part and the at least the second part of the plurality of signals; and
    a location engine to:
    process at least the information identifying the signal strengths of the at least the first part of the plurality of signals to determine a position of location of the tag; and
    process at least the information identifying the signal strengths of the at least the second part of the plurality of signals to determine an area of location of the tag.

2. The system of claim 1, wherein the location engine is further to determine if the position of location of the tag is within the area of location of the tag, and if the position of location of the tag is within the area of location of the tag, then to determine the position of location of the tag to be a final position of location of the tag.

3. The system of claim 1, the location engine further to transmit a location request to the tag before the tag is to broadcast the plurality of signals.

4. The system of claim 1, the location engine further to process also the information identifying the signal strengths of the at least the second part of the plurality of signals to determine the position of location of the tag.

5. The system of claim 1, the location engine further to process the information representing the signal strengths of the at least the first part of the plurality of signals to determine the area of location of the tag.

6. The system of claim 1, wherein the information identifying the signal strengths of the at least the first part and the at least the second part of the plurality of signals are in the form of received signal-strength indicators (RSSIs).

7. The system of claim 1, wherein the calculation of the position of location of the tag further comprises optimizing multipath parameters in a radio-frequency (RF) propagation model equation.

8. The system of claim 1, wherein the directional antennas of the plurality of routers have half-power beamwidths that are at least substantially 80°.

9. The system of claim 1, wherein the directional antennas of the plurality of routers have half-power beamwidths that are substantially 90°.

10. The system of claim 1, wherein the directional antennas of the plurality of routers have half-power beamwidths oriented in substantially the same direction.

11. The system of claim 1, wherein the at least one omni-directional antenna of each router comprises two or more omni-directional antennas.

12. The system of claim 1, wherein the at least one directional antenna of each router comprises two or more directional antennas.

13. A method for real-time determination of the location of a tag, comprising:
    (a) broadcasting, from the tag, a plurality of signals to a plurality of routers, each of the routers comprising one or more omni-directional antennas and one or more directional antennas;
    (b) receiving, by the one or more omni-directional antennas of each of the plurality of routers, at least a first part of the plurality of signals;
    (c) receiving, by the one or more omni-directional antennas of each of the plurality of routers, at least a second part of the plurality of signals;
    (d) transmitting, by each of the plurality of routers, to a location engine, information identifying signal strengths of the first part and the second part of the plurality of signals received;
    (e) processing, by the location engine, at least the information representing the signal strengths of the first part of the plurality of signals received by each router to determine a position of location of the tag; and
    (f) processing, by the location engine, at least the information representing the signal strengths of the first part of the plurality of signals received by each router to calculate an area of location of the tag.

14. The method of claim 13, further comprising (g) determining, by the location engine, if the position of location of the tag is within the area of location of the tag, and if the position of location of the tag is within the area of location of the tag, then determining the position of location of the tag to be a final position of location of the tag.

15. The method of claim 14, wherein if the location engine determines that the position of the tag is not within the area of the tag, then repeating (a) through (g).

16. The method of claim 14, wherein the determination of the position of location of the tag at (e) further comprises optimizing multipath parameters in a radio-frequency (RF) propagation model equation, and wherein the optimizing of the multipath parameters comprises repeating, for each of the plurality of routers, (a) through (g) but with the tag replaced by that router.

17. The method of claim 13, further comprising, before (a), transmitting a location request from the location engine to the tag.

18. The method of claim 13, further comprising, before (e), determining for each of the plurality of routers, by the location engine, an average of the at least the first part of the plurality of signals received by the omni-directional antennas of that router, wherein the processing, by the location engine, of at least the first signals to calculate a position in which the tag may be located comprises processing of at least the average of the at least the first part of the plurality of signals.

19. The method of claim 13, further comprising, before (f), determining for each of the plurality of routers, by the location engine, an average of the at least the second part of the plurality of signals received by the directional antenna of that router, wherein the processing, by the location engine, of the at least the second part of the plurality of signals to calculate an area in which the tag may be located comprises processing of at least the average of the at least the first part of the plurality of signals.

20. The method of claim 13, wherein the directional antennas of the plurality of routers have half-power beamwidths that are substantially 90°.

21. The method of claim 13, wherein the directional antennas of the plurality of routers have half-power beamwidths that are at least substantially 80°.

22. The method of claim 13, wherein the directional antennas of the plurality of routers have half-power beamwidths oriented in substantially the same direction.

23. The method of claim 13, the processing by the location engine at (e) to calculate the position of location of the tag further comprising processing the information representing the signal strengths of the at least the second part of the plurality of signals received by each router.

24. The method of claim 13, the processing by the location engine at (f) to calculate the area of location of the tag further comprising processing the information representing the signal strengths of the at least the first part of the plurality of signals received by each router.

25. The method of claim 13, wherein the information identifying the signal strengths of the at least the first part and the second part of the plurality of signals received by each of the plurality of routers are in the form of received signal-strength indicators (RSSIs).

26. The method of claim 13, wherein the calculation of the position of location of the tag at (e) further comprises optimizing multipath parameters in a radio-frequency (RF) propagation model equation.

27. A system for determining a position of location of a tag, comprising:
   a plurality of routers each comprising at least one omni-directional antenna, the plurality of routers comprising at least three routers; and
   a location engine to:
   (a) determine for at least one router, from at least a part of signals sent by the one router and received by the at least one omni-directional antenna of each of at least one other of the routers, an average path loss of signal strength;
   (b) optimize, for at least the one router, multipath parameters in a radio-frequency (RF) signal propagation model equation using the average path loss for each of the at least one other of the routers and known distance between the router and each of the at least one other of the routers; and
   (c) determine the position of location of the tag using at least the optimized multipath parameters.

28. The system of claim 27, wherein the determination of the position of location of the tag at (c) comprises determining, from at least a part of signals sent by the tag and received by the at least one omni-directional antenna of each of at least any three of the routers, an average path loss of signal strength.

29. The system of claim 28, wherein the determination of the position of location of the tag at (c) further comprises using the optimized multipath parameters and the average path loss for each of the at least any three of the routers in the radio-frequency (RF) signal propagation model equation to determine distances between the tag and the at least any three of the routers.

30. The system of claim 27, wherein the optimization at (b) further comprises determining a final average error in distance between the one router and the at least one other of the routers, and wherein the determination of the position of location of the tag at (c) comprises using the final error in a probability density function.

31. The system of claim 27, the location engine further to:
   (d) determine, from at least a part of signals sent by the tag and received by the at least one omni-directional antenna and further received by the at least one directional antenna of each of the at least any three of the routers, an average signal strength of the received signals by each of the at least one omni-directional antenna and the at least one directional antenna; and
   (e) determine an area of location of the tag using the average signal strengths.

32. The system of claim 31, wherein (e) comprises:
   determining an area of location associated with each router;
   determining a first ranking of the at least any three of the routers by average signal strength of the signals received by their at least one omni-directional antennas;
   determining a second ranking of the at least any three of the routers by increasing difference between the average signal strength of the signals received by their at least one omni-directional antennas and the average signal strength of the signals received by their at least one directional antennas;
   determining the overall top ranked router combined between the first ranking and the second ranking; and
   determining the area of location of the tag as the area of location associated with the overall top ranked router.

33. The system of claim 32, the location engine further to:
   (f) determine if the position of location of the tag is within the area of location of the tag, and if the position of location of the tag is within the area of location of the tag, then to determine the position of location of the tag to be a final position of location of the tag.

34. The system of claim 27, wherein the determined position of location of the tag at (c) is determined as a final position of location of the tag.

* * * * *